(12) United States Patent
Sauvignet

(10) Patent No.: US 8,062,529 B2
(45) Date of Patent: Nov. 22, 2011

(54) METHOD FOR WATER TREATMENT BY FLOCCULATION/SETTLING USING BALLASTED FLOC DEGRITTING OF THE SLUDGE

(75) Inventor: Philippe Sauvignet, Saint-Etienne-En-Cogles (FR)

(73) Assignee: OTV SA, Saint Maurice Cedex (FR)

( * ) Notice: Subject to any disclaimer, the term of this patent is extended or adjusted under 35 U.S.C. 154(b) by 555 days.

(21) Appl. No.: 12/280,086

(22) PCT Filed: Feb. 19, 2007

(86) PCT No.: PCT/EP2007/051575
§ 371 (c)(1),
(2), (4) Date: Oct. 16, 2008

(87) PCT Pub. No.: WO2007/096337
PCT Pub. Date: Aug. 30, 2007

(65) Prior Publication Data
US 2009/0050570 A1 Feb. 26, 2009

(30) Foreign Application Priority Data

Feb. 20, 2006 (FR) ...................................... 06 01485

(51) Int. Cl.
C02F 1/52 (2006.01)
C02F 11/12 (2006.01)
(52) U.S. Cl. ........ 210/709; 210/711; 210/713; 210/714; 210/727; 210/740

(58) Field of Classification Search .................. 210/711
See application file for complete search history.

(56) References Cited

U.S. PATENT DOCUMENTS

| 2,852,138 | A | * | 9/1958 | Knight et al. ................. 210/744 |
| 5,080,803 | A | * | 1/1992 | Bagatto et al. ................ 210/709 |
| 5,480,559 | A | * | 1/1996 | Smisson ....................... 210/727 |
| 5,770,091 | A | * | 6/1998 | Binot et al. ................... 210/711 |
| 6,824,692 | B2 | * | 11/2004 | Binot et al. ................... 210/709 |
| 7,311,841 | B2 | * | 12/2007 | Binot et al. ................... 210/666 |
| 7,332,097 | B2 | * | 2/2008 | Fout et al. .................... 210/788 |

FOREIGN PATENT DOCUMENTS

| EP | 0767143 | 4/1997 |
| JP | 10151373 | 6/1998 |
| WO | 03053862 | 7/2003 |

* cited by examiner

*Primary Examiner* — Peter A Hruskoci
(74) *Attorney, Agent, or Firm* — Coats & Bennett, P.L.L.C.

(57) ABSTRACT

A method for treating water includes directing untreated water into a mixing zone in a water treatment system and mixing the untreated water with a flocculating agent and a ballast to form a ballast-floc mixture. Thereafter, the ballast-floc mixture is directed to a settling zone where the mixture settles to form sludge. Treated water is discharged from the settling zone and the sludge is directed to a separator. The method further includes separating at least a portion of the ballast from the sludge and directing the separated ballast from the separator to the mixing zone. Finally, the sludge is directed from the separator to a sludge treatment reactor where at least some of the remaining ballast settles from the sludge and substantially ballast-free sludge is discharged from the sludge treatment reactor.

17 Claims, 2 Drawing Sheets

Figure 1:
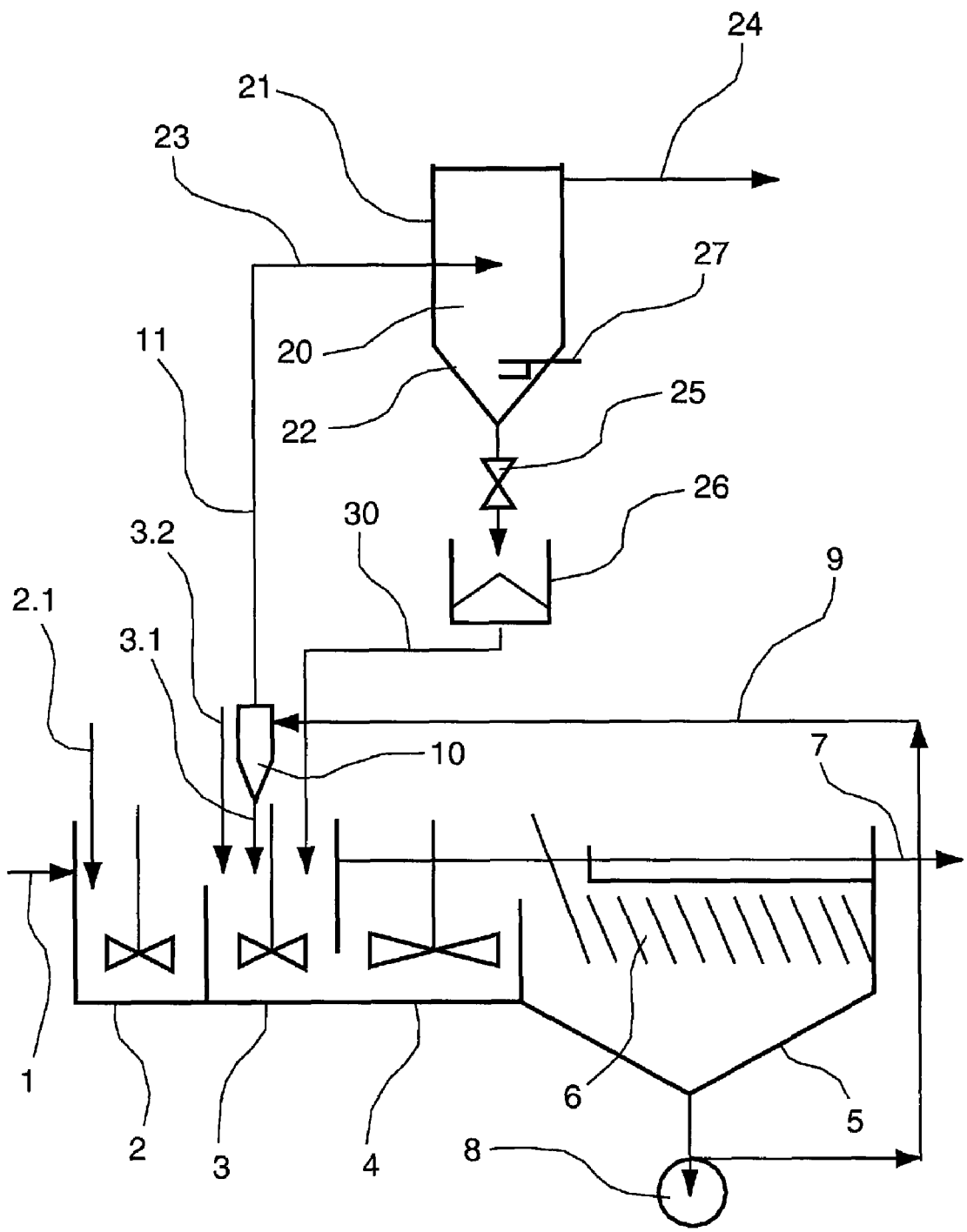

METHOD FOR WATER TREATMENT BY FLOCCULATION/SETTLING USING BALLASTED FLOC DEGRITTING OF THE SLUDGE

This application is a U.S. National Stage Application of PCT Application No. PCT/EP2007/051575, with an international filing date of 19 Feb. 2007. Applicant claims priority based on French Application Serial No. 06/01485 filed 20 Feb. 2006.

The invention relates to the field of water treatment, in particular for water purification.

More specifically, the invention relates to water treatment by ballasted floc flocculation/settling using a granular material as a ballast.

The methods implementing such a treatment are known to those skilled in the art. These methods make it possible to create particularly compact settling units, due to the accumulation of the floc to be settled on a fine, inert granular material, which is denser than water, which makes it possible to raise the settling rates to high values, greater than 15 m/hour and up to more than 100 m/hour.

The granular material used in such methods is generally fine sand, of a diameter usually ranging between 40 and 300 micrometers, more frequently between 80 and 200 micrometers.

More specifically, such methods consist in transiting the water to be treated, after coagulation in line or in a coagulation zone, into at least one stirred mixing zone wherein at least one flocculating agent and the granular ballast material, which is generally sand and is referred to as such hereinafter, are injected. The water then enters a settling zone, preferentially after a passage in an intermediate stirred zone wherein the flocculation is completed. The floc, consisting of flocculated sludge around sand grain(s), rapidly decantate in the settling zone, equipped or not with strips, is taken up at the bottom of the settling zone and sent, generally by means of pumping and transport pipes, to one or more sand-sludge separating units. These separating units usually consist of hydrocyclones. The excess sludge extracted from the separating unit (for example, from the hydrocyclone overflow) is sent, degritted, towards the sludge treatment whereas the sand (extracted from the hydrocyclone underflow, for example), is recycled towards the mixing zone. The treated water is sent downstream via the settling overflow.

This type of method according to the prior art in fact represents a good sand trap, in that all the sludge extracted from the method enters a sand-extraction hydrocyclone. In practice, this type of method usually makes it possible to limit the sand loss in the sludge to less than 3 grams of sand per cubic metre of treated water the sand. Since a sludge extraction rate generally ranged between 5% and 15% of the flow rate of the water to be treated, a maximum of approximately 20 to 60 grams of sand are lost per cubic metre of sludge extracted, which is low compared, for example, to the sand content present in the primary settling sludge (30% for sludge originating from waste water treatment methods and up to 80% to 90% for sludge originating from water purification methods).

Nevertheless, sand may exceptionally escape from the sand-sludge separating units (essentially in the event of clogging of the overflow of a hydrocyclone). In this case, the sludge has a higher sand content, which is liable to cause risks of clogging, abrasion and mechanical wear of the sludge treatment equipment and result in the need to extract said sand from the sludge before the treatment thereof.

The main aim of the invention is to solve this technical problem, i.e. minimise the risk of the flow towards the sludge treatment, of the granular material used as a ballast, with the sludge extracted from a water treatment plant by flocculation/settling using ballasted floc.

Another aim of the present invention is to provide a combination of the ballasted floc decantation with a device for eliminating the ballast material from the sludge of ballasted floc flocculation/settling structures, said device being both inexpensive and efficient, and enabling easy automation of the operation of said device and of the extraction and recirculation to the flocculation/settling structure of the sand extracted from the sludge.

These aims are achieved by means of the invention which relates to a water treatment plant comprising means for supplying water to be treated towards at least one mixing zone, means for injecting at least one flocculating agent into said mixing zone, means for injecting into said mixing zone at least one fine granular ballast material which is denser than water, a settling zone, means for discharging the mixture of granular material and sludge formed in said settling zone towards at least one unit for separating the granular material and the sludge of said mixture, means for discharging the clarified water from said settling zone, means for discharging the excess sludge separated by said at least one separating unit, and first means for recycling the granular material separated by said at least one separating unit towards said mixing zone, characterised in that said plant includes at least one device for trapping said granular material that is provided on said means for discharging the sludge originating from said at least one granular material/sludge separating unit and in that it includes second recycling means of the granular material trapped by said trapping device towards said mixing zone.

It should be noted that, conventionally, the water entering such a plant will preferentially be coagulated before entering the plant or in a coagulation zone of said plant, provided upstream from the said mixing zone.

Also conventionally, an intermediate zone used to complete the flocculation, and preferentially comprising stirring means, will also be provided between said mixing zone and said settling zone.

The settling zone may in turn be provided with strips favouring settling, as already described in the prior art.

The trapping device and the second recycling means according to the present invention make it possible to considerably minimise losses of the granular material used as a ballast (conventionally, sand with a grain size less than 300 mm).

In addition, as this device is simple to produce, it does not involve any significant additional cost of the plant containing it.

It may be envisaged to produce said trapping device according to different embodiments. However, particularly advantageously, said device comprises an essentially vertical body, means for supplying the sludge originating from the separating unit preferentially provided at approximately half of the height thereof, a base essentially forming a funnel, and means for discharging the degritted sludge. The body in question may be prismatic but will be preferentially cylindrical in order to favour the flow of the granular material.

Most preferentially, said means for supplying the sludge originating from the separating unit will be devised tangentially to said body of this trapping device.

According to an alternative embodiment, said means for discharging the degritted sludge are provided in the upper part of said cylindrical body of the trapping device.

According to another alternative embodiment, said means for discharging the degritted sludge are provided in the lower part of said cylindrical body, which makes it possible to use the trapping device as a sludge densifier.

In this case, said device preferentially comprises means for discharging the overflows provided in the upper part of the cylindrical body and, if applicable, means for recycling said overflows towards said mixing zone.

Advantageously, the base of said device is essentially conical or tapered and preferentially the angle of the generatrices of the base with the horizontal is ranging between 45° and 60°.

According to a particularly advantageous alternative embodiment of the invention, said trapping device is provided with a valve controlling the communication of the inside of said trapping device with said second recycling means. Also preferentially, the trapping device is provided with at least one sensor of the granular material height in the body or the base of said trapping device or the granular material mass present therein. Said sensor may for example be of the vibrating blade, ultrasound or infrared sounder type.

Preferentially, the plant is provided with means for the automatic opening of said valve as a function of a time grid or as a function of the data recorded by said sensor. The opening of the valve may thus be controlled by a given idle time between two openings, or by a given volume of sludge entering the trapping device, or by the measurement of the quantity of water having transited in the plant in a given period of time.

The present invention also aims to cover any method using a plant such as that described above characterised in that it comprises a step consisting of transiting said water in said plant at a surface velocity (ratio of the incoming flow rate by the water surface area) greater than 15 m/hour and in that it comprises a step consisting of transiting said sludge in said trapping device at a surface velocity lower than 20 m/hour, preferentially between 10 and 15 m/hour.

Also preferably, such a method also comprises a step consisting of transiting the granular material trapped by said trapping device towards said second recycling means, as a function of time data or data relating to the quantity of granular material present therein.

Advantageously, the device for trapping the granular material may be used as a sludge densifier.

Figure 2:
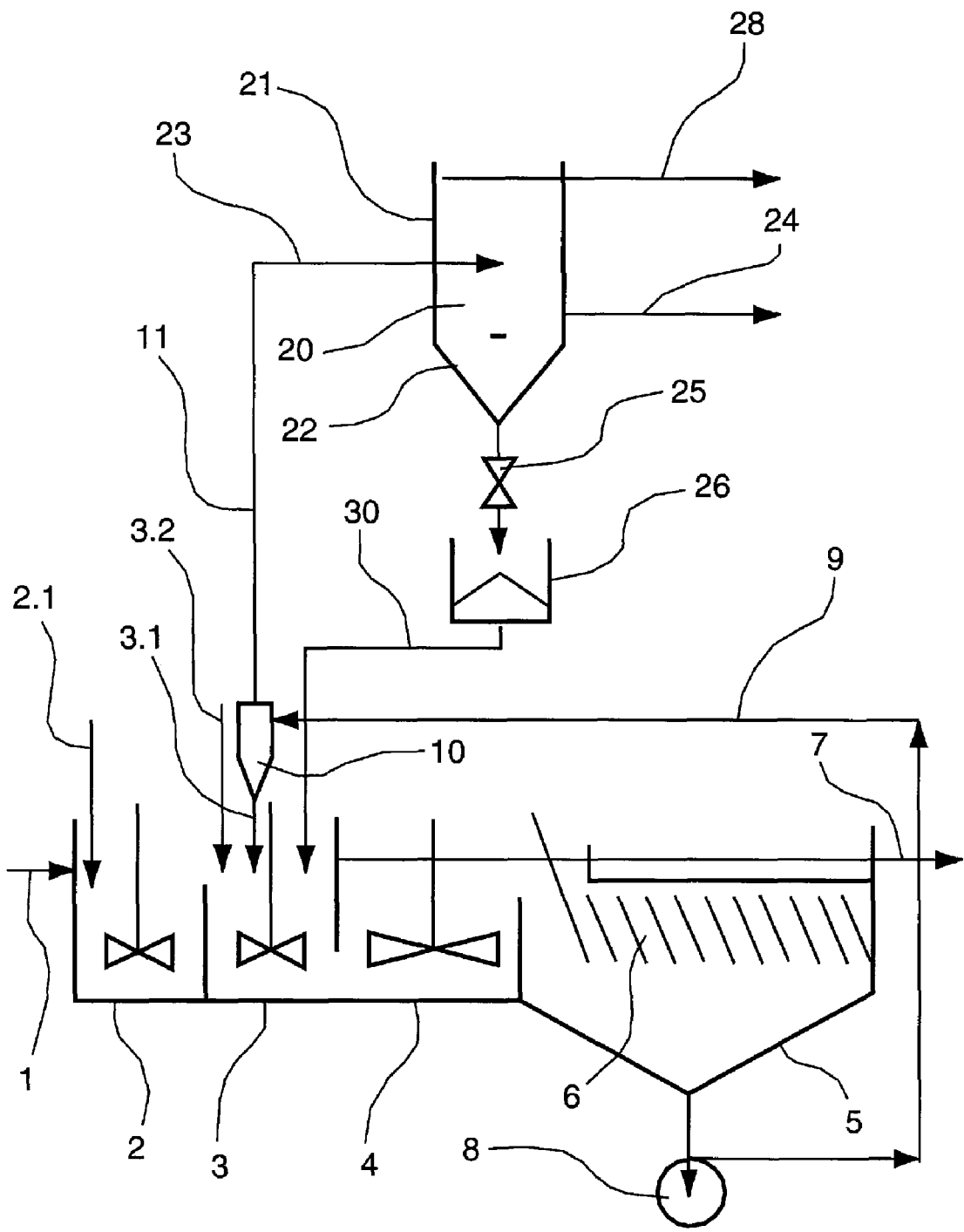

The invention, along with the various advantages offered by same will be understood more clearly by means of the following description of two non-limitative embodiments thereof with reference to FIGS. 1 and 2.

The plant described in FIG. 1 includes, conventionally, means 1 for supplying water to be treated towards a coagulation zone 2 provided with stirring means, at least one mixing zone 3 provided with stirring means, an intermediate zone 4 also provided with stirring means, means 2.1 for injecting at least one coagulating agent into said coagulation zone, means 3.2 for injecting at least one flocculating agent into said flocculation zone, means 3.1 for injecting sand into said mixing zone 3, a settling zone 5 provided with settling strips 6, discharging means 9, including pumping means 8 of the granular material and sludge mixture formed in said settling zone towards a separating unit 10 of the granular material and the sludge from said mixture consisting of a hydrocyclone, means 7 for discharging the clarified water from said settling zone 5, means 11 for discharging the excess sludge separated by the hydrocyclone, first means for recycling the granular material separated by the hydrocyclone towards said mixing zone, said means consisting of means for supplying sand 3.1.

According to the present invention, the plant is also provided with a device 20 for trapping the sand provided on the means 11 for discharging the sludge originating from the hydrocyclone 10.

The trapping device 20 comprises a vertical cylindrical body 21 with a conical base 22, the angle of the generatrices of the base with the horizontal being 60°. In this embodiment, the surface area of the horizontal section of the body 20 is 3.97 m$^2$.

The sludge arrives in the device 20 forming a sand trap via supply means consisting of a tube 23 opening at approximately half the height of the vertical body, tangentially to the body 21.

The surface area of said cylindrical vertical body 21 is chosen such that the surface velocity of the sludge in the device 20 is lower than 20 m/hour, and preferentially ranged between 10 m/hour and 15 m/hour. This surface velocity corresponds to the ratio between the sludge flow rate in cubic metres per hour entering the device 20 and the surface area in square metres of the horizontal section on the free surface in the body 21.

The base 22 of the device 20 is equipped with a valve 25, normally closed, while the sand-free sludge is extracted, preferentially in the upper part 24 of the device 20.

The sand settles in the trap produced in this way and accumulates in the base 22 thereof where it is periodically extracted by opening, advantageously in an automated manner, the valve 25.

In this embodiment, the sand is retrieved in a bucket 26 and returned by recycling means 30 to the mixing zone 2.

The opening of the valve 25 is controlled by the measurement of the level of settled sand in the sand trap, using a suitable sensor 27 (ultrasound or vibrating blade sensor, for example).

The opening time is set to enable all the settled sand to be discharged via the valve 25.

The plant represented in FIG. 1 was used with a treated water flow rate of 1000 m3/hour of unit type municipal waste water and with a surface settling velocity in the ballasted floc flocculation/settling structure of 90 m/hour and an average extracted sludge flow rate from the hydrocyclone of 50 m3/hour, with an average of 6 g SS/litre.

The quantity of sand retrieved by the device 20 was 1.44 kg/day (daily average over 1 month, after washing, drying, weighing).

In the embodiment represented in FIG. 2, wherein the identical references to those used with reference to FIG. 1 refer to identical components, the sand trap 20 also serves as a sludge densifier. In this case, the densified sludge is extracted in 24 in the lower part of the device 20, above the valve 25 and at a sufficient vertical distance from said valve to enable the accumulation of the sand, which settles more rapidly than the sludge, at the bottom of the structure.

The overflows of the densifier are extracted in 28, and recycled if required upstream from the ballasted floc flocculation/settling (recycling not shown).

The invention claimed is:

1. A method for treating water comprising:
   directing untreated water into a mixing zone in a water treatment system, the water treatment system including the mixing zone, a settling zone, a separator, and a ballast trapping device;
   mixing the untreated water with a flocculating agent and a ballast in the mixing zone to form a ballast-floc mixture;
   directing the ballast-floc mixture from the mixing zone to the settling zone, settling the ballast-floc mixture in the settling zone, and forming sludge and treated water;

discharging the treated water from the settling zone;
directing the sludge from the settling zone to the separator and separating at least a portion of the ballast from the sludge in the separator;
directing the separated ballast from the separator to the mixing zone;
directing the sludge from the separator to the ballast trapping device;
settling at least some of the remaining ballast from the sludge in the ballast trapping device and forming a substantially ballast-free sludge; and
directing a flow of the substantially ballast-free sludge to sludge treatment equipment, wherein clogging, abrasion, and mechanical weir caused by ballast is minimized in said sludge treatment equipment.

2. The method of claim 1 further comprising recirculating at least a portion of the settled ballast from the ballast trapping device into the mixing zone.

3. The method of claim 1 wherein the ballast trapping device comprises a generally vertical body having a height and a generally funnel-shaped base and wherein the method further comprises directing the sludge from the separator into the ballast trapping device at approximately one half of the height of the vertical body.

4. The method of claim 3 further comprising tangentially directing the sludge from the separator to the body of the ballast trapping device.

5. The method of claim 3 further comprising discharging at least a portion of the substantially ballast-free sludge from an upper part of the body.

6. The method of claim 3 comprising discharging at least a portion of the substantially ballast-free sludge from a lower part of the body.

7. The method of claim 3 wherein the body is generally cylindrical.

8. The method of claim 7 wherein the base is generally conical or tapered.

9. The method of claim 3 wherein an angle between the base and a theoretical horizontal line is between approximately 45° and approximately 60°.

10. The method of claim 1 further comprising directing at least portion of the sludge from the ballast trapping device to the mixing zone.

11. The method of claim 1 further comprising directing the settled ballast from the ballast trapping device to the mixing zone by opening a valve in the ballast trapping device.

12. The method of claim 1 further comprising sensing the height or mass of the settled ballast in the ballast trapping device with a sensor.

13. The method of claim 12 wherein the ballast trapping device includes a valve that opens and closes for controlling the flow of settled ballast from the ballast trapping device and wherein the method further comprises automatically opening the valve as a function of time or as a function of the sensed height or mass of the settled ballast in the ballast trapping device.

14. The method of claim 1 further comprising directing the water into the water treatment system at a surface velocity greater than approximately 15 m/hour and directing the sludge into the ballast trapping device at a surface velocity of less than approximately 20 m/hour.

15. The method of claim 14 further comprising directing the sludge into the ballast trapping device at a surface velocity of between approximately 10 m/hour and approximately 15 m/hour.

16. The method of claim 14 further comprising recirculating the settled ballast from the ballast trapping device to the mixing zone as a function of time or as a function of the quantity of ballast in the ballast trapping device.

17. The method of claim 1 further comprising increasing the density of the sludge in the ballast trapping device.

* * * * *